United States Patent

Beukers et al.

[11] Patent Number: 5,934,741
[45] Date of Patent: Aug. 10, 1999

[54] SELF-SUPPORTING REFRIGERATED TRUCK

[75] Inventors: Adriaan Beukers, Heemstede; Stefaan Emiel Elisabeth De Winter, Zoetermeer; Willem Diederik Brouwer, The Hage, all of Netherlands

[73] Assignees: Technische Universiteit Delft, Delft; Stichting Composieten in de Carrosseriebouw, Sassenheim, both of Netherlands

[21] Appl. No.: 08/784,258

[22] Filed: Jan. 15, 1997

[30] Foreign Application Priority Data

Jan. 15, 1996 [NL] Netherlands ............................ 1002096

[51] Int. Cl.$^6$ .................................................. B62D 33/00
[52] U.S. Cl. ............................ 296/181; 296/183; 296/901
[58] Field of Search ..................................... 296/181, 183, 296/203.01, 203.03, 901, 210

[56] References Cited

U.S. PATENT DOCUMENTS

| | | |
|---|---|---|
| 3,003,810 | 10/1961 | Kloote et al. . |
| 3,181,311 | 5/1965 | Latzer . |
| 3,224,500 | 12/1965 | Bennett . |
| 3,711,148 | 1/1973 | Hindin ............................... 296/901 X |
| 3,746,388 | 7/1973 | Robinson ............................. 296/901 X |
| 4,082,882 | 4/1978 | Weinstein et al. .................. 296/901 X |
| 4,482,589 | 11/1984 | Widman ............................... 296/901 X |
| 4,542,933 | 9/1985 | Bischoff .................................. 296/164 |
| 5,143,416 | 9/1992 | Karapetian .......................... 296/183 X |
| 5,150,944 | 9/1992 | Yoshida et al. ..................... 296/901 X |
| 5,403,063 | 4/1995 | Sjostedt et al. ..................... 296/901 X |
| 5,507,405 | 4/1996 | Thomas et al. ..................... 296/181 X |
| 5,553,906 | 9/1996 | Kunz ............................... 296/203.03 X |
| 5,700,118 | 12/1997 | Bennett et al. ..................... 296/183 X |
| 5,730,485 | 3/1998 | Sjostedt et al. ..................... 296/183 X |
| 5,741,042 | 4/1998 | Livingston et al. ................ 296/181 X |

FOREIGN PATENT DOCUMENTS

| | | |
|---|---|---|
| 0 554 539 | 8/1993 | European Pat. Off. . |
| 2 599 317 | 12/1987 | France . |
| 39 37 969 | 5/1991 | Germany . |
| 2 241 516 | 9/1991 | United Kingdom . |

Primary Examiner—D. Glenn Dayoan
Attorney, Agent, or Firm—Young & Thompson

[57] ABSTRACT

Self-supporting refrigerated truck comprising a floor, two side walls, a front bulkhead and a roof. The components are all constructed as sandwich panels. The connection between the rear axle construction of the refrigerated truck and the front is not provided with longitudinal beams. The function of the chassis is taken over by the side walls, which are capable of absorbing loads because the skin and sandwich panels of the side walls have appreciable strength and a fill of appreciable compressive strength is also provided. In order to transmit forces into the side walls it is proposed to accommodate the vertically extending trusses in the side walls, which trusses are joined to cross-members of the rear axle construction which extend over the entire width. The fixing for the floor and each side wall comprises a section which has four flanges, which preferably extend perpendicularly, with a first flange close to the inner limit of the side wall, a second flange close to the top of the floor, a third flange as a continuation of the second flange and extending in the thickness of the side wall and a fourth flange comprising a continuation of the first flange in the floor or the boundary between floor and side wall.

9 Claims, 7 Drawing Sheets fig-3a fig-3b

SELF-SUPPORTING REFRIGERATED TRUCK

The present invention relates to a self-supporting refrigerated truck comprising a rear axle construction on which a box-like body is mounted, said body comprising a floor, two side walls, a roof and a front bulkhead, each having sandwich panels provided with a core consisting of insulating material, wherein the rear axle construction is connected exclusively via the body to the front of the truck, wherein, in cross-section, at least part of the floor between the rear axle construction and the front of the truck exclusively comprises, over the full width: one or more mutually joined sandwich panels, wherein the or each sandwich panel exclusively comprises two spaced skins with a core arranged between them, said core comprising a fill which is effective in all directions, wherein each side wall comprises a sandwich panel comprising an insulating fill and wherein the floor adjoins the side wall in such a way that (the extension of) the lower boundary of the floor and (the extension of) the underside edge of each side wall adjoin one another, wherein each side wall is provided with a number of vertical trusses which extend over essentially the entire height of the side walls and are joined to the side wall.

A self-supporting refrigerated truck of this type is disclosed in U.S. Pat. No. 3 181 311.

Many proposals for realizing a more or less self-supporting concept have already been disclosed in the prior art. For different transport applications the volume or the loading capacity must be maximised. Restrictions on volume and total weight of such refrigerated trucks are imposed by national or international governments. For refrigerated trucks the weight of the load is generally the limiting factor and the aim is, therefore, for a truck unladen weight which is as low as possible.

In the prior art it has been proposed no longer to make use of the chassis under the body, so that, in fact, a self-supporting body is realized. With constructions of this type the floor of the body consists of a combination of longitudinal beams, extending over the entire length of the refrigerated truck, and cross-members, fitted for reinforcement. In refrigerated trucks the height of the longitudinal beams can be used in an optimum manner by fitting foam material to improve the insulating properties of the floor.

Although in constructions of this type there is no longer any question of a chassis on which a body is placed, there is still a question of beams which extend in the longitudinal direction and are integrated in or on the side of the floor or floor construction.

Consequently, the weight can be reduced somewhat, but the weight still constitutes the limiting factor for loading refrigerated trucks of this type.

Furthermore, it has been found that, in particular in Europe, the European Union is tending to reduce the maximum weight of a combination. This a further incentive to achieve a reduction in the weight of a refrigerated truck.

Longitudinal beams are not used in U.S. Pat. 3,181,311, but there are a large number of cross-members. As a result of the particular construction of the floor, a saving in weight can be achieved by dispensing with longitudinal beams.

The aim of the present invention is to further improve the construction described above for a self-supporting refrigerated truck in such a way that cross-members are also not necessary in the section between the coupling to the truck (or support for the landing wheels) and the section where the rear axle or rear axles is/are located.

This aim is realized with a self-supporting refrigerated truck as described above in that a section with several flanges is mounted in the boundary between the floor and each side wall, a first flange being arranged close to the inner limit of a side wall, a second flange being arranged close to the top of the floor and a third flange, being constructed as a continuation of the second flange, extending in the thickness of the side wall.

As a result of fitting the section described above, forces and bending moments of the side walls can be transmitted to the floor. If a construction of this type is not used, it has been found that the floor will sag on prolonged loading and in an extreme case detach from the side walls. Such a risk arises, for example, with the construction which is described in French Patent Application 2 599 317.

According to an advantageous embodiment of the invention the section has a fourth flange which is a continuation of the first flange in the downward direction and which either extends into the floor or is arranged in the boundary between floor and side wall.

According to a further advantageous embodiment of the invention, the rear axle construction comprises a subframe with cross-members mounted on either side of each axle, said cross-members extending to the side walls of the body, wherein the vertical trusses located close to the rear axle construction are mechanically joined to the ends of said cross-members.

According to a preferred embodiment, the floor comprises two sandwich panels which are fitted one on top of the other and have a common skin, wherein the fill in the upper sandwich panel comprises a pressure-resistant material and the fill in the lower panel comprises a mechanically high-grade foam. The latter is understood to be not polystyrene or PUR foam but a PVC foam or PMI foam. In this context the top layer, which can be provided with a wear-resistant finish, has appreciable strength against point loading. Such point loading occurs during loading and unloading the truck or as a result of the load. A honeycomb consisting of aluminium material or balsa wood can be used for this purpose.

The underlying sandwich panel must contain an insulating foam to ensure the insulating properties of the refrigerated truck. Furthermore, this foam must have a certain mechanical strength and consequently it is not possible to use polyurethane or polystyrene. Preferably, a PVC foam having a compressive strength of at least 1 is used for this purpose.

The side walls can each consist of one or more sandwich panels. Preferably, a single sandwich panel is used which has two spaced skins, between which the trusses are accommodated such that they fit closely, and the core of the sandwich panel comprising PVC foam, polystyrene or PUR foam. The side walls must be able to act as a shear field in the self-supporting body. Moreover, as indicated above, it is necessary for the side walls to be able to absorb and transmit forces.

The trusses are preferably made up of composite material. These trusses preferably comprise two spaced strips of carbon fibre-reinforced material. With this arrangement the fibre direction is in the longitudinal direction, that is to say in the vertical direction. A pressure-resistant foam, such as PVC foam, of increased density is used between said strips.

As indicated above, the truck can be a motor truck, a trailer or a semi-trailer.

If the truck is constructed as a semi-trailer or a trailer there is a kingpin, steering bogie or a similar construction at the front. This construction is fixed by means of a yoke to a metal carrier plate, which carrier plate is provided with cross-members. According to the invention, these components can be integrated in the floor, the cross-members extending as far as the side walls of the body, which side walls are provided with trusses at the location of the cross-members, each truss being mechanically joined to the ends of the cross-members and extending over essentially the entire height of the side walls, being joined to the sandwich panel and having a resistance to elongation in the vertical direction of more than $2.10^7$ N.

At this point the same inventive concept is applied as in the case of the join between rear axle construction and body of the refrigerated truck. That is to say, the forces are directed from the underside of the truck into the side walls.

In the invention, the cross-members at the front of the truck, which have been mentioned above, are manufactured from high-grade composite material.

Short longitudinal beams can be joined to the cross-members for further reinforcement.

If the refrigerated truck is constructed as a semi-trailer there will also be a support point for landing wheels between the rear axle construction and the kingpin. This support point can also be constructed in the manner described above, that is to say incorporation of one or more cross-members, optionally integrated in the floor, joined to trusses which extend vertically in the side walls. A construction of this type with trusses can also be used in the front wall or where a load, such as a cooling unit, is mounted on the wall.

The invention will be explained in more detail below with reference to illustrative embodiments shown in the drawings. In the drawings.

Figure 1:
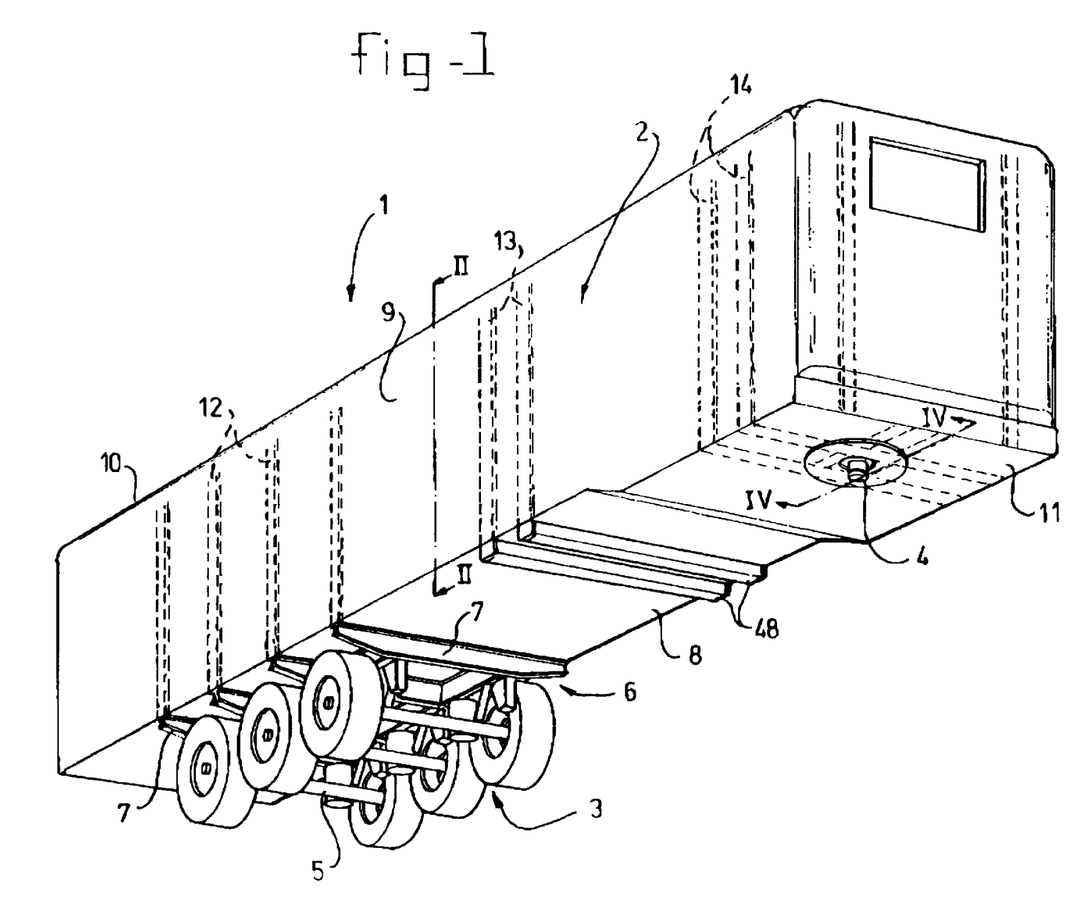
FIG. 1 shows a perspective view of a semi-trailer according to the invention.

In FIG. 1 the semi-trailer according to the invention is indicated in its entirety by 1. This semi-trailer consists of a body 2, beneath which an axle construction 3 consisting of three axles 5 is mounted. These axles 5 are accommodated in a sub-frame 6 which is provided with, inter alia, cross-members 7. Such cross-members 7 bear on the floor 8. The floor 8 is provided at the front with a kingpin 4 for coupling to a truck. In the vicinity of the kingpin 4 the floor is thicker, which is indicated by 11.

The body is also provided with side walls 9 and a roof 10.

It can be seen from FIG. 1 that trusses 12, which extend vertically, are fitted in the side walls 9 at the location of the cross-members 7. In addition, cross-members 48 for connection to landing wheels, which are not shown, are mounted beneath the floor. The ends of said cross-members are connected to vertical trusses 13. Corresponding trusses 14 are located close to the kingpin 4.

Figure 2:
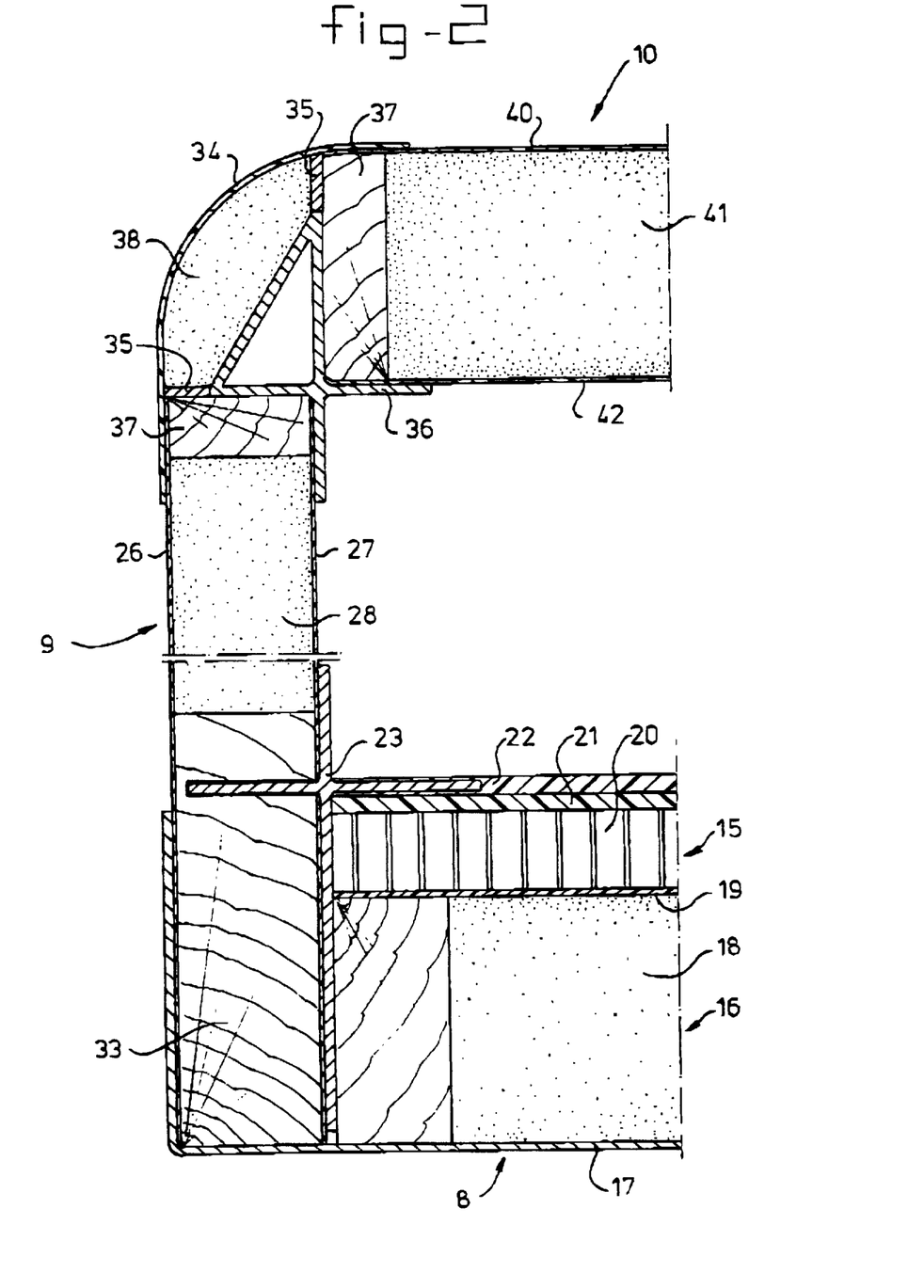
FIG. 2 shows a cross-section along the line II—II in FIG. 1.

FIG. 2 shows a cross-section along the line II—II in FIG. 1.

It can be seen from FIG. 2 that the floor 8 consists of two sandwich panels 15 and 16 placed one on top of the other. The lower sandwich panel 16 consists of an outer sheet or skin 17, a fill 18 and an inner sheet 19. The inner sheet 19 is common to sandwich panel 15, which in addition consists of a honeycomb structure 20 and a floor sheet 21, on which an anti-wear layer 22 has been applied. This anti-wear layer can be thin because the composite layer beneath it is wear-resistant. Layer 21 is, in particular, subjected to point loading during loading, unloading and transport. For this reason the core of structure 20 is of honeycomb construction. It is also possible to produce the core from balsa wood, but a plastic foam is preferably not placed directly beneath layer 21. The top skin can consist of a composite material having a fibre orientation of 0 and 90°. By this means both strength and rigidity in the longitudinal direction and strength and rigidity in the transverse direction are obtained. It is also possible to use sheet aluminium or the like instead of a fibre-reinforced material, but in this context it must be pointed out that on subjection to heavy loading, sheet aluminium will undergo permanent deformation, which frequently is undesirable.

By means of the structure 20, the point loading is uniformly distributed over inner sheet 19. The compressive strength of the core of structure 20 must be about 5 MPa. In view of the high cost price and the poor insulating properties, the aim is to make this core as thin as possible. In practice, a thickness of 12 mm has proved to be an acceptable minimum.

Layer 19 preferably consists of a plastic composite with random orientation. After all, said layer has to absorb the loading on the honeycomb partitions.

As is indicated, fill 18, consisting of PVC foam with a thermal conductivity of, for example, 0.03 W/Km, is arranged beneath layer 19. This foam must have a compressive strength of at least 1 MPa and more particularly 1.3 MPa.

Outer sheet 17 can, in turn, consist of an aluminium layer or composite material with a fibre orientation of 0/90° and ±45°. The outer sheet 17 must have a certain degree of shear strength in order to be able to absorb loads which are produced on taking relatively short bends.

A height of 80 mm and more particularly 100 mm for the entire floor construction may be mentioned by way of example.

Figure 3A:
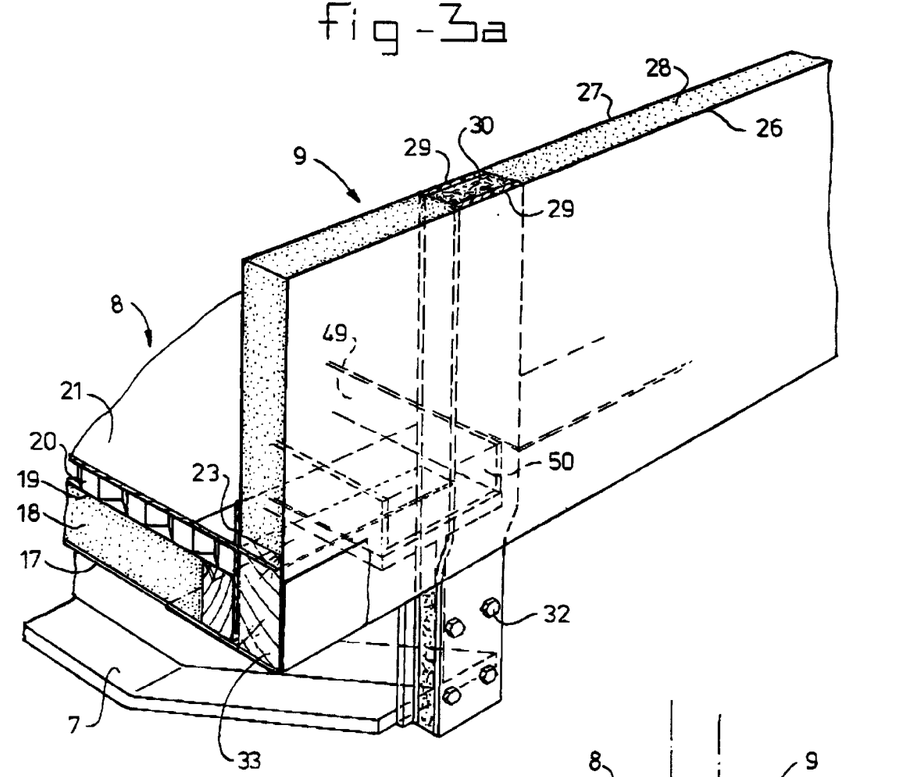
FIGS. 3a, b show a detail of the fixing of the vertical trusses to the cross-members.

As can be seen from FIG. 3a, the side walls consist of an outer sheet 26, a fill 28 and an inner sheet 27. In addition, as can be seen from FIG. 1, there are trusses 12, which extend vertically and consist of carbon strips 29 and fill 30, at the location of the rear axle construction.

Sheets 26 and 27 preferably consist of composite materials with a fibre orientation of, inter alia, ≈45° because the side walls have a characteristic shear function in the self-supporting body. In this context it is important that the sheets are able to withstand impacts from both outside and inside.

The fill 28 serves not only for insulation but also as support for the skins to prevent buckling of the sheets as a consequence of loading of the rear axle construction, for absorbing forces originating from the rear axle construction.

Preferably, polyvinyl chloride foam of normal density is used. In this way a sandwich panel is produced which has appreciable strength to withstand impacts, provides adequate insulation and is also able to absorb buckling stresses. The thickness of the side wall 9 is at least 45 mm. In the embodiment shown, the side walls extend to the underside of the floor, but the walls can also be continued such that they extend to or beyond the underside of the cross-members 7.

The carbon strips 29 are made of a composite material containing carbon fibres, which carbon fibres extend in the vertical direction. Where directions are indicated in this description and these claims, reference is to the use position of the truck according to the invention.

A fill of, preferably, PVC foam of elevated density is present between said carbon strips 29. The resistance to elongation, being the product of rigidity and the surface area of the cross-section of the carbon in the vertical direction, is at least $2.10^7$ N and preferably $7.8 \times 10^7$. As will also be explained below, vertical forces are introduced into the trusses and distributed over the side walls. A good join between side walls and trusses is therefore important and said forces can be effectively absorbed as a result of the ±45° orientation of the skins of the side walls. The truss used must have a buckling strength of at least 20,000 N and preferably 30,000 N.

The roof 10 likewise consists of outer sheet 40, fill 41 and inner sheet 42. The requirements in respect of the strength of the foam material of the fill 41 are less stringent. In connection with the loading which occurs, the skins have, in particular, shear strength in connection with torsion and rigidity in the longitudinal direction, because of the upper linking function for the entire body, a fibre orientation (if said sheets are made of composite) of preferably ±45° and less than 0°. The thickness of the roof can be between 80 and 120 mm. The various features are partly dependent on the desired insulation value and the thickness of the floor used.

It can be seen from the cross-section of the floor that no longitudinal beams have been incorporated therein. Instead of such beams, the forces are transmitted from the axle construction 3 to the cross-members 7, which are joined to the vertical trusses 12 in the manner shown in FIG. 3a. A join of this type comprises a bolt connection 32. In addition, the construction of the join between floor and side wall can be seen from this figure, as well as from FIG. 2. A cross-shaped section 23, which, for example, can be constructed of extruded aluminium or also of stainless steel or plastic, is fitted and on one side is glued to the floor and more particularly the floor sheet 21, and on the other side is glued to layer 27 of the side wall. It is pointed out that the side wall extends downward beyond the horizontal part of the cross-shaped section and this region is indicated by 33. Outer sheet 17 extends as far as this region 33 and is glued thereto. In this way a non-positive connection which is able to transmit high transverse forces and bending moments is obtained between the floor and side wall. This is important because, after all, all forces have to be directed into the side wall.

Figure 3B:
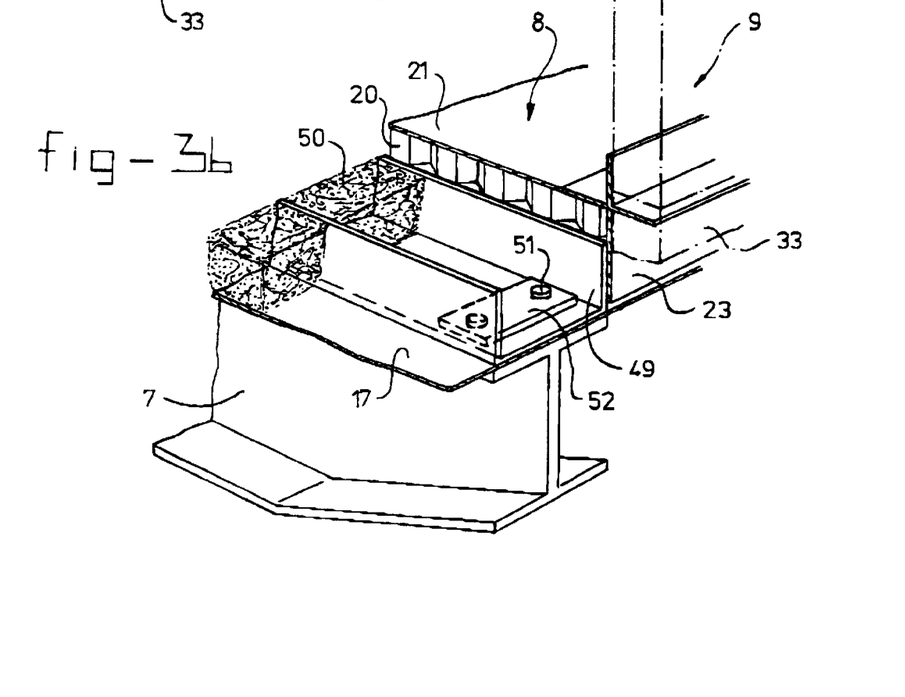

It can be seen from FIG. 3b that U-sections 49 can be accommodated in the floor 10 at the location of the cross-members 7. These U-sections can be made either of metal or of composite material. The fill 50 for said sections 49 can then once again consist of a PVC foam material of elevated density. The bolts 51 can engage cross-members 7 and strips, for example steel strips 52, can be fitted to provide a screw thread. It is optionally possible to mount short longitudinal beams on these sections 49 to absorb braking and acceleration forces as well as lateral forces. However, it must be understood that in the floor 8 according to the invention there are no longitudinal beams extending over the entire length.

A corresponding construction is used at the top, that is to say between side wall and roof (FIG. 2). This construction consists of a section 36 which extends over the entire length and which, for example, can consist of extruded aluminium, plastic or steel. The ends of the sandwich panels for the roof and the side walls are provided with protective components 37, such as wood.

It will be understood that special measures have to be taken for the insulation. To this end a rounded outer section 34 is present and foam fill 38 is arranged between the outer section 34 and the extrusion 36. Because the foam fill has a limited supporting function, it can be made of polyurethane or polystyrene foam. In addition, fillets 35 are present which consist of an insulating material.

Instead of the corner joint described above, it is also possible to use a so-called finger joint, in which case it is possible to construct the corner joint from composite as well.

Although it is not shown in more detail, it will be understood that a construction for attaching a bumper can be mounted on the underside of the floor. Optionally, beams can extend as far as the sub-frame.

Figure 4:
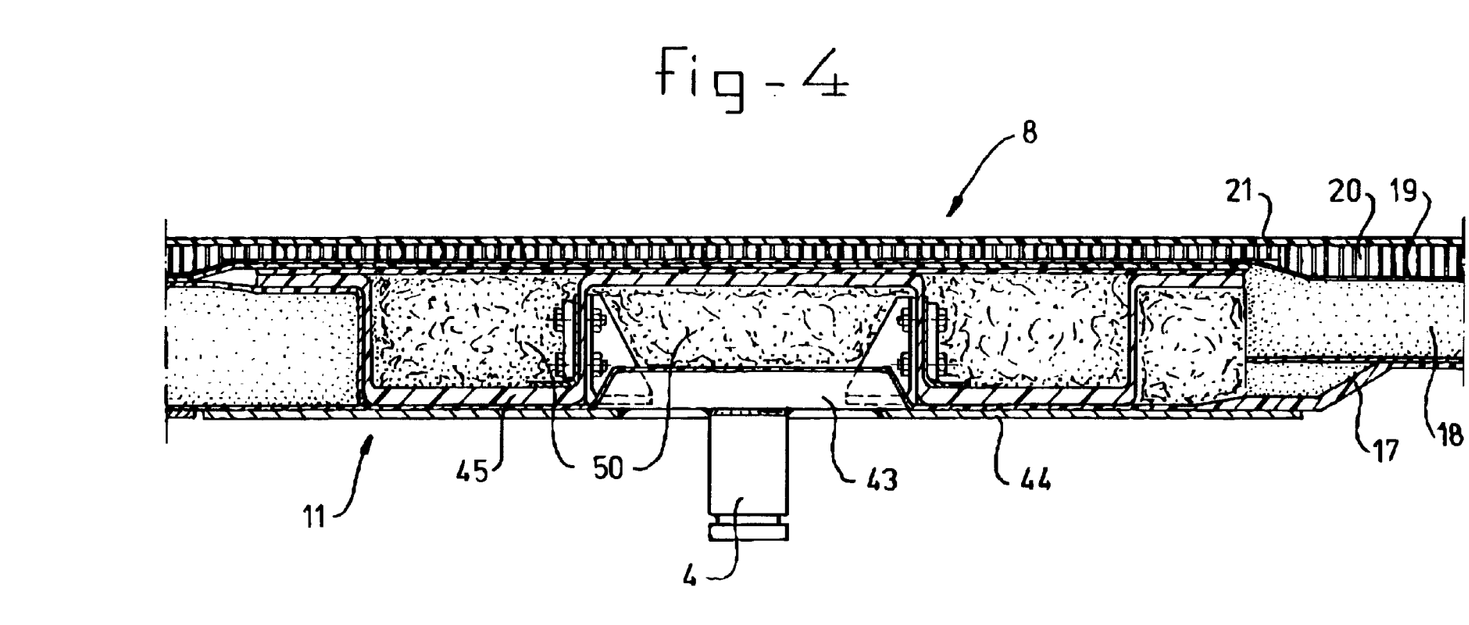
FIG. 4 shows a section along the line IV—IV in FIG. 1.
Figure 5:
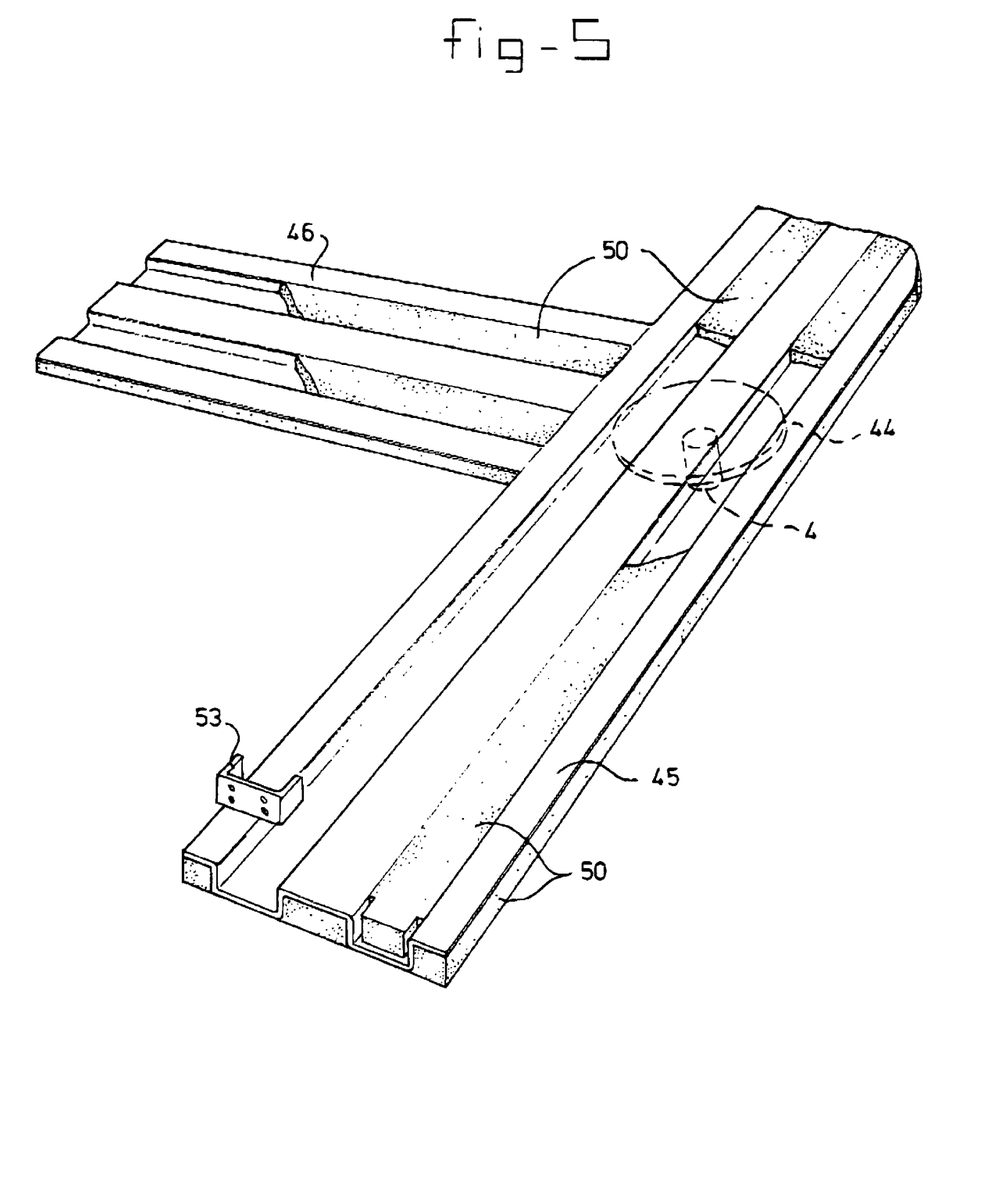
FIG. 5 shows further details of a first embodiment of the kingpin construction of the truck according to the invention.
Figure 6:
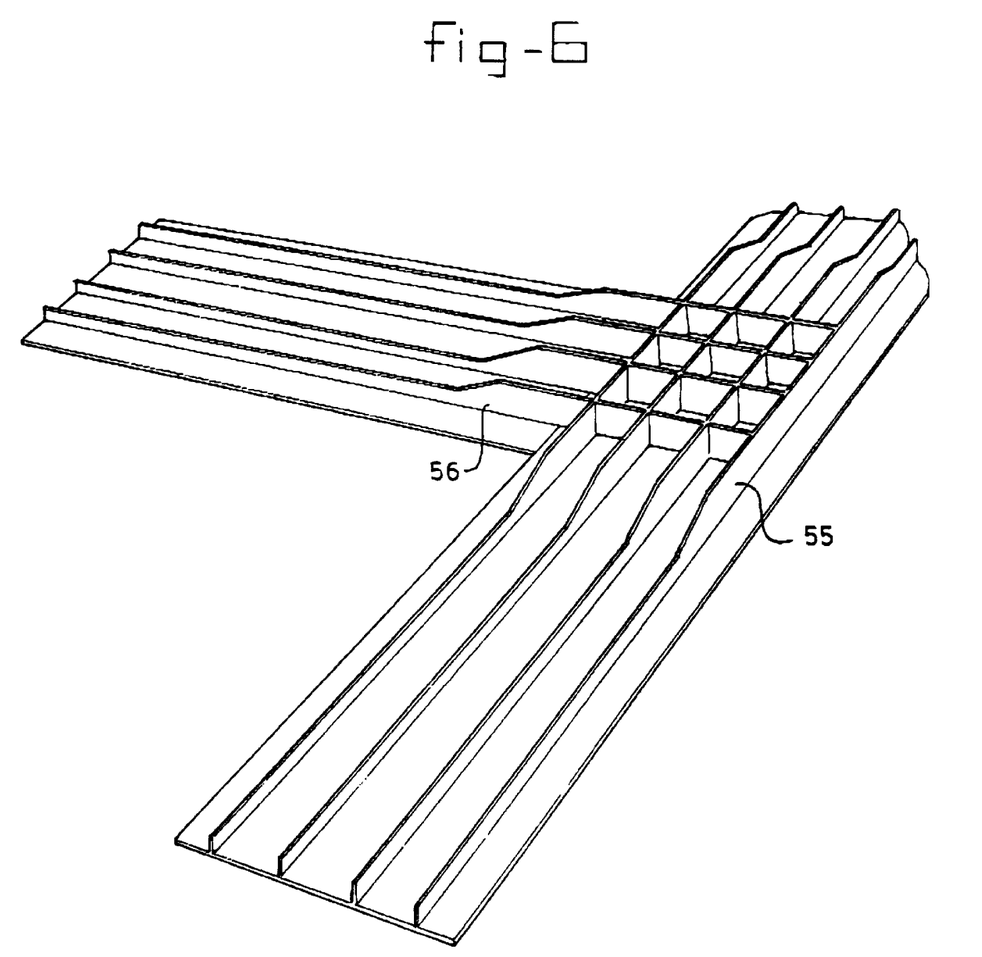
FIG. 6 shows a second embodiment of the kingpin construction of a refrigerated truck according to the invention and FIG. 7 shows a cross-section of a modified construction of the connection between the roof and the floor along a line having the same location as line II—II in FIG. 1.

FIGS. 4–6 show details of the front of the semi-trailer and more particularly the kingpin construction.

It can be seen from FIG. 4 that the kingpin 4 is joined to a yoke 43. These two components are supplied fixed to one another as a unitary component. According to current regulations, yoke 43 is fixed to a carrier plate 44, for example an 8 mm thick steel carrier plate. The semi-trailer construction can be fixed to this. The carrier plate 44 is fixed to two cross-members 45, as can be seen on comparison of FIGS. 4 and 5. These cross-members are made of composite material of high rigidity, preferably carbon. This is necessary because of the high overstressing between kingpin and side wall because of the lack of longitudinal beams. It is also desirable to use bolts in addition to fixing by gluing. In view of the high cost price of a box beam of a composite material 45, a so-called omega beam is used. PVC foam of elevated density is arranged inside the U. The orientation of the fibres used for the beams 45 is preferably 0° in the horizontal upper and lower links and ±45° in the vertical webs. Beams of this type are able to withstand a bending moment of $1. \, 10^8$ N mm. In view of this relatively complex construction and the high desired rigidity and strength, the floor is thickened somewhat at the location of the kingpin construction. This thickness can be up to 150 mm. Connecting fittings 53 (FIG. 5) are provided at the end of the cross-members, which fittings provide a connection between cross-members and the vertical trusses 14. These vertical trusses 14 are mounted in the same way as trusses 12 in side wall 9 and are constructed in the same way. That is to say, loads on the cross-members 45 are transmitted to the side walls. Apart from the cross-members 45, short longitudinal beams 46 are present. The latter serve to absorb the forces which can arise on coupling up.

FIG. 6 shows a variant of the construction shown above, in which, instead of plastic composite material, a steel plate is used on which webs are mounted, the webs extending transversely being indicated by 55 and the webs extending in the longitudinal direction being indicated by 56. This is in fact a variant of the preferred embodiment in which the lower link of the composite omega-shaped beam has been replaced by a steel plate.

Figure 7:
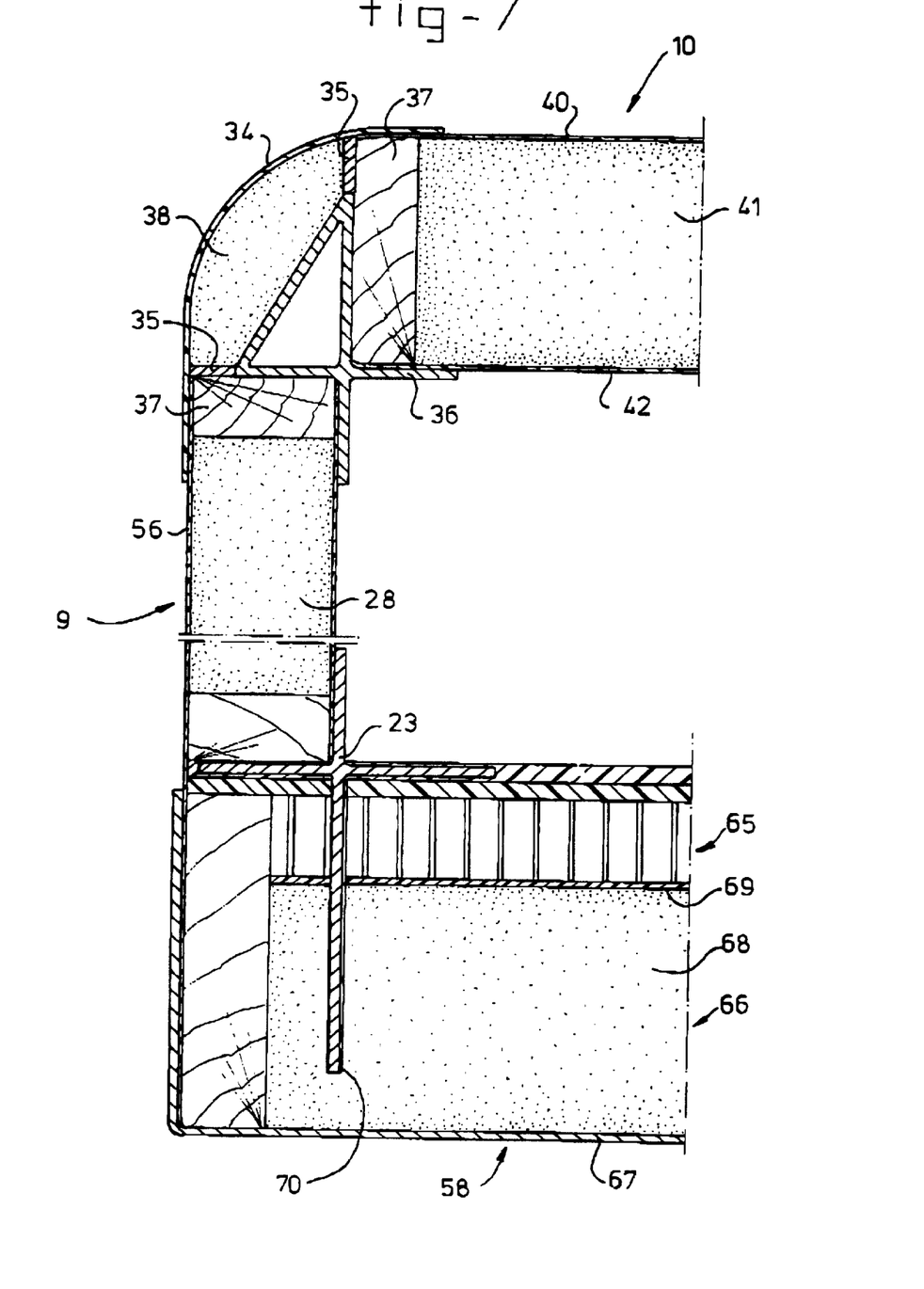

FIG. 7 shows a variant of the construction which can be seen in detail from FIG. 2. In the construction shown in FIG. 7 a different construction is used for connection of the floor to the wall. In contrast to what has been shown in FIG. 2, the floor now extends to the side of the vehicle (with the exception of the outer sheet 56 of the wall 28) and the wall extends as far as the cross-shaped section 23. In this embodiment the floor is indicated by 58 and likewise consists of two sandwich panels 65 and 66 placed one on top of the other. The lower sandwich panel 66 consists of an outer sheet or skin 67, a fill 68 and an inner sheet 69. Fill 68 extends as far as a capping boundary which, for example, can be formed by a wooden or plastic block close to the side of the vehicle. A groove 70 for accommodating that part of section 23 which extends downwards is made both in fill 68 and in sandwich panel 65 and inner sheet 69.

Although the invention has been described above with reference to preferred embodiments, it will be understood that numerous modifications can be made thereto without going beyond the scope of the present application.

For instance, it is possible to use other fibre materials of high strength instead of carbon. The same applies with respect to the other plastic materials used, such as the foam. Moreover, numerous variants in the construction are possible, which will be evident to a person skilled in the art after reading the above description and which fall within the scope of the appended claims.

We claim:

1. In a self-supporting refrigerated truck comprising a rear axle construction on which a box-like body is mounted, said body comprising a floor, two side walls, a roof and a front bulkhead, each having sandwich panels provided with a core consisting of insulating material, wherein the rear axle construction is connected exclusively via the body to the front of the truck, wherein, in cross-section, at least part of the floor between the rear axle construction and the front of the truck comprises, over the full width: one or more mutually joined said sandwich panels, wherein the or each sandwich panel comprises two spaced skins with a said core arranged between them, said core comprising a fill which is effective in all directions, wherein each side wall comprises a said sandwich panel comprising an insulating fill and wherein the floor adjoins the side wall in such a way that an extension of the lower boundary of the floor and an extension of the underside edge of each side wall adjoin one another, wherein each side wall is provided with a number of vertical trusses which extend over essentially the entire height of the side walls and are joined to the side wall; the improvement wherein a section with several flanges is mounted in the boundary between the floor and each side wall, a first flange being arranged close to the inner limit of a side wall, a second flange being arranged close to the top of the floor, a third flange, being constructed as a continuation of the second flange, extending in the thickness of the side wall and a fourth flange comprising a continuation of the first flange being arranged in the floor or the boundary between floor and side wall.

2. Self-supporting refrigerated truck according to claim 1, wherein said rear axle construction plural axles and a subframe with cross-members mounted on either side of each axle, which cross-members extend to the side walls of the body, wherein the vertical trusses located close to the rear axle construction are mechanically joined to the ends of said cross-members.

3. Refrigerated truck according to claim 1, wherein said floor comprises two sandwich panels which are fitted one on top of the other and have a common skin, wherein said fill in the upper sandwich panel comprises a pressure-resistant material and the fill in the lower panel comprises a mechanically high-grade foam.

4. Refrigerated truck according to claim 1, wherein each side wall comprises a single sandwich panel which has two skins located some distance apart, between which said trusses are accommodated such that they fit closely, and the core of the sandwich panel comprises mechanically high-grade foam.

5. Refrigerated truck according to claim 1, wherein said trusses comprise two strips of material reinforced with carbon fibre extending in the vertical direction, which strips are located some distance apart and between which a material of high shear strength and rigidity is arranged.

6. Refrigerated truck according to claim 1, wherein the truck is a semi-trailer and is provided at the front with a kingpin with yoke attached to a metal carrier, plate, which carrier plate is provided with cross-members, which kingpin and yoke are accommodated in said floor, said cross-members extending as far as the side wall of the body, which side wall is provided with said trusses at the location of the cross-members, each truss being mechanically joined to the ends of the cross-members and extending over essentially the entire height of the side walls, being joined to the sandwich panel and having a resistance to elongation in the vertical direction of more than $2.10^7$ N.

7. Refrigerated truck according to claim 6, wherein the cross-members are made of plastic composite material.

8. Refrigerated truck according to claim 6, wherein longitudinal beams which are joined to the cross-members and have a length of at most 200 cm are located in the floor.

9. Refrigerated truck according to one of claim 6, wherein, between the rear axle construction and the kingpin, support points for landing wheels are mounted on the floor of the body, said support points comprising at least one cross-member extending in the floor and joined to a truss extending in the side wall.

* * * * *